US008886831B2

(12) United States Patent
Tirumalai et al.

(10) Patent No.: US 8,886,831 B2
(45) Date of Patent: Nov. 11, 2014

(54) SYSTEM AND METHODOLOGY FOR FAST LINK FAILOVER BASED ON REMOTE UPSTREAM FAILURES

(75) Inventors: Gokul S. Tirumalai, San Jose, CA (US); Albert Hyde Mitchell, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1168 days.

(21) Appl. No.: 11/398,519

(22) Filed: Apr. 5, 2006

(65) Prior Publication Data

US 2007/0237085 A1    Oct. 11, 2007

(51) Int. Cl.
*G06F 15/173*  (2006.01)
*H04L 1/00*  (2006.01)
*H04L 12/26*  (2006.01)
*H04L 12/707*  (2013.01)
*H04Q 3/00*  (2006.01)

(52) U.S. Cl.
CPC .............. *H04Q 3/0087* (2013.01); *H04L 45/22* (2013.01)
USPC ........... 709/239; 709/238; 370/218; 370/219; 370/228

(58) Field of Classification Search
CPC ............................ H04Q 3/0087; H04L 45/22
USPC .......... 709/238, 239; 370/241, 244, 245, 248, 370/217, 218, 225–227, 228
See application file for complete search history.

(56) References Cited

U.S. PATENT DOCUMENTS

| 5,835,696 | A | | 11/1998 | Hess | |
|---|---|---|---|---|---|
| 6,032,194 | A | * | 2/2000 | Gai et al. | 709/239 |
| 6,330,229 | B1 | * | 12/2001 | Jain et al. | 370/256 |
| 6,392,990 | B1 | * | 5/2002 | Tosey et al. | 370/218 |
| 6,442,133 | B2 | | 8/2002 | Owada | |
| 6,513,129 | B1 | * | 1/2003 | Tentij et al. | 714/4 |
| 6,535,491 | B2 | * | 3/2003 | Gai et al. | 370/256 |
| 6,542,934 | B1 | * | 4/2003 | Bader et al. | 709/239 |
| 6,628,661 | B1 | * | 9/2003 | Goldman et al. | 370/408 |
| 6,678,241 | B1 | * | 1/2004 | Gai et al. | 370/216 |
| 6,697,339 | B1 | * | 2/2004 | Jain | 370/256 |
| 6,721,275 | B1 | * | 4/2004 | Rodeheffer et al. | 370/238 |
| 6,801,506 | B1 | * | 10/2004 | Dey | 370/256 |
| 6,891,808 | B2 | * | 5/2005 | Ishii | 370/256 |
| 6,956,824 | B2 | * | 10/2005 | Mark et al. | 370/242 |

(Continued)

OTHER PUBLICATIONS user. (2001). In Hargrave's Communications Dictionary, Wiley. Retrieved on Aug. 2, 2010. Retrieved from the Internet: <URL:http://www.credoreference.com/entry/hargravecomms/user>.*

(Continued)

*Primary Examiner* — Rupal Dharia
*Assistant Examiner* — Wing Ma
(74) *Attorney, Agent, or Firm* — Patterson & Sheridan LLP (57) ABSTRACT

A method and apparatus that promote expedited fast link failover decisions by and end station with redundant multi-layer switching paths to a network are disclosed. In response to detecting a change in connectivity with an upstream link to a network, an upstream switch may send a notification to an intermediate switch with a downstream link to the end station. In response to the notification, the intermediate switch may disable ("bring down") the downstream link to the end station. Bringing the downstream link down in this manner may cause the end station to switch ("failover") to a different downstream link, for example, allowing the end station to establish connectivity to the network via a redundant path.

22 Claims, 8 Drawing Sheets

(56) References Cited

U.S. PATENT DOCUMENTS

| | | | |
|---|---|---|---|
| 6,987,740 B1* | 1/2006 | Di Benedetto et al. | 370/256 |
| 7,016,351 B1* | 3/2006 | Farinacci et al. | 370/392 |
| 7,197,660 B1 | 3/2007 | Liu et al. | |
| 7,453,900 B2* | 11/2008 | Robinson et al. | 370/431 |
| 7,480,283 B1 | 1/2009 | Sylvain | |
| 7,518,986 B1 | 4/2009 | Chadalavada et al. | |
| 7,580,349 B1 | 8/2009 | Wang et al. | |
| 7,593,319 B1* | 9/2009 | Sivasankaran et al. | 370/216 |
| 7,616,561 B1* | 11/2009 | Liu et al. | 370/225 |
| 2002/0112072 A1* | 8/2002 | Jain | 709/239 |
| 2002/0152320 A1* | 10/2002 | Lau | 709/238 |
| 2002/0167895 A1 | 11/2002 | Zhu et al. | |
| 2002/0184387 A1* | 12/2002 | Yamaya et al. | 709/238 |
| 2003/0016624 A1* | 1/2003 | Bare | 370/217 |
| 2003/0021226 A1 | 1/2003 | Mor | |
| 2003/0097470 A1* | 5/2003 | Lapuh et al. | 709/239 |
| 2003/0137932 A1* | 7/2003 | Nishioka et al. | 370/216 |
| 2003/0158964 A1* | 8/2003 | Kobayashi | 709/238 |
| 2003/0161260 A1 | 8/2003 | Murugan | |
| 2003/0179700 A1* | 9/2003 | Saleh et al. | 370/216 |
| 2003/0185225 A1 | 10/2003 | Wirth et al. | |
| 2004/0001449 A1 | 1/2004 | Rostron et al. | |
| 2004/0047336 A1 | 3/2004 | Shabtay et al. | |
| 2004/0098501 A1* | 5/2004 | Finn | 709/236 |
| 2004/0105390 A1* | 6/2004 | Saksio | 370/245 |
| 2004/0133693 A1 | 7/2004 | Wils et al. | |
| 2004/0264364 A1* | 12/2004 | Sato | 370/217 |
| 2005/0063395 A1 | 3/2005 | Smith et al. | |
| 2005/0108401 A1 | 5/2005 | Gonda | |
| 2005/0111350 A1 | 5/2005 | Kano | |
| 2006/0023630 A1 | 2/2006 | Akiyama et al. | |
| 2006/0159011 A1 | 7/2006 | Dalal et al. | |
| 2006/0206602 A1* | 9/2006 | Hunter et al. | 709/223 |
| 2006/0227704 A1* | 10/2006 | Nakagawa et al. | 370/217 |
| 2006/0256712 A1 | 11/2006 | Imajuku et al. | |
| 2007/0041313 A1* | 2/2007 | Hidle | 370/216 |
| 2007/0047436 A1* | 3/2007 | Arai et al. | 370/219 |
| 2007/0047578 A1* | 3/2007 | Abe et al. | 370/468 |
| 2007/0070886 A1* | 3/2007 | Zirin | 370/225 |
| 2007/0076727 A1* | 4/2007 | Shei | 370/401 |
| 2007/0183347 A1 | 8/2007 | Gu et al. | |
| 2007/0280103 A1 | 12/2007 | Savage et al. | |
| 2008/0016402 A1* | 1/2008 | Harel et al. | 714/43 |
| 2008/0181196 A1 | 7/2008 | Regan et al. | |
| 2009/0096592 A1 | 4/2009 | Wu et al. | |
| 2009/0109998 A1 | 4/2009 | Vinayagam et al. | |
| 2010/0020680 A1 | 1/2010 | Salam et al. | |

OTHER PUBLICATIONS user. (2006). In ATIS Telecom Glossary, Alliance for Telecommunications Industry Solutions. Retrieved on Aug. 2, 2010. Retrieved from the Internet: <URL:http://www.is-works.com/glossary/definition.aspx?id=336>.* designate. (2007). In the American Heritage® Dictionary of the English Language. Retrieved on Aug. 2, 2010. Retrieved from the Internet: <URL:http://www.credoreference.com/entry/hmdictenglang/designate>.*

Office Action History for U.S. Appl. No. 12/180,934 from Mar. 22, 2010 to Dec. 23, 2010.

* cited by examiner

SYSTEM AND METHODOLOGY FOR FAST LINK FAILOVER BASED ON REMOTE UPSTREAM FAILURES

BACKGROUND OF THE INVENTION

1. Field of the Invention

The present invention generally relates to management of switched computer networks and, more particularly, to propagating detected changes in upstream connectivity to downstream devices.

2. Description of the Related Art

A computer network generally includes a number of devices, including switches, routers and hubs, connected so as to allow communication among the devices. The devices within a network may be generally categorized into two classes: end stations connected along the edge of a network and network devices. End stations typically include devices that primarily supply or consume information, such as workstations, desktop PCs, printers, servers, hosts, fax machines, and other such devices. Network devices typically include devices that primarily transfer information between other devices (e.g., between end stations and other network devices), such as gateways, switches, routers, and other such devices. In other words, network devices generally provide connectivity between end stations and the network core.

Figure 1:
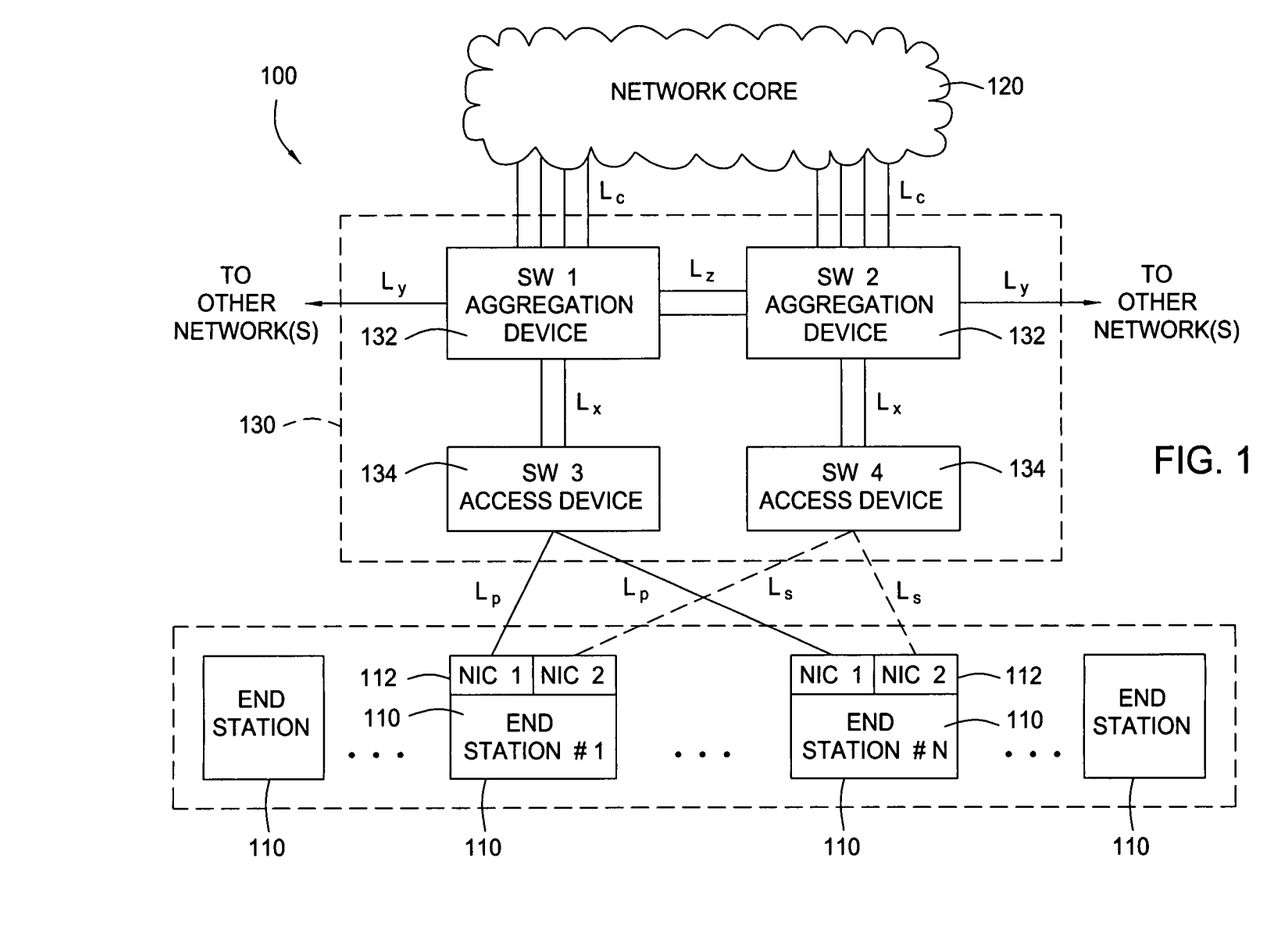
FIG. 1 illustrates an exemplary multilayer switched network.

FIG. 1 illustrates an exemplary network 100 in which a plurality of end stations 110 are connected to a network core 120 via multiple layers of switches 130. In some cases, the network may be modeled in accordance with the Open System Interconnection (OSI) model, which defines a networking framework for implementing protocols in multiple (seven) layers. The switches 130 may represent Data Link or "Layer 2" layer switching, that encodes and decodes data packets into bits. Layer 2 switches implement the network transmission protocol and handle errors in the physical layer (Ethernet, optics, etc.), flow control and frame synchronization. In the illustrated example, switches 130 include aggregation switches 132 (SW1 and SW2), and access switches 134 (SW3 and SW4). The end stations 110 may be file servers, data servers, workstations, personal computers (PCs), and the like.

In an effort to provide greater reliability, such networks are often designed to provide redundant Layer 2 connectivity between end stations 110 and the network core 120. To this end, at least some end stations 110 may each have multiple network interface cards NICs 112 (or other type network interface/adapter), allowing the end stations 110 to connect to the network through primary links/connections (Lp) and secondary links (Ls). For example, the end stations may be configured to connect to the network through a primary path (via SW3 and SW1) by default and switch (or "failover") to a secondary path (via SW4 and SW2) if a connectivity problem is detected in the primary path, such as a loss of connectivity to a link $L_C$ between switch SW1 and the network core 120.

In conventional systems, end stations do not become aware of a change in upstream connectivity until they discover it on their own. For example, end stations may only discover a loss of upstream connectivity after experiencing consistent protocol packet timeouts. As a result, after a loss in network connectivity on the primary path, end stations may not immediately switch from their primary path to their alternative path despite a loss in network connectivity on the primary path, which may degrade network performance.

Therefore, there is a need for techniques that cause end stations to switch over to alternative paths more rapidly in response to remote upstream connectivity changes.

SUMMARY OF THE INVENTION

Embodiments of the present invention provide techniques for propagating changes in upstream connectivity downstream to connected end stations.

One embodiment provides a method for managing a network path between at least one end station and a network. The method generally includes detecting, by a first switching device, a change in status of a first upstream communication link between the first switching device and the network, sending, by the first switching device, notification of the change in status to a second switching device in communication with the end station via a first downstream communication link, and, in response to receiving the notification, disabling by the second switch, the first downstream communication link in a manner that causes the end station to failover to a second downstream link between a third switch and the end station.

Another embodiment provides a network switching system generally including at least a first switching device and at least a second switching device. The first switching device is generally configured to detect a change in status of a first upstream communication link between the first switching device and a network core. The second switching device is generally configured to receive, from the first switching device, notification of the change in status from the first switching device and, in response, disable a first downstream communication link between the second switching device and an end station. For some embodiments, their may be one or more intermediate switching devices, between the first and second switching devices, that receive the notification of the change in status from the first switching device and propagate the notification (possibly through other intermediate switches) to the second switching device that ultimately disables the first downstream communication link with the end station.

Another embodiment provides a system generally including a plurality of end stations, at least a first switching device, and at least a second switching device. The first switching device is generally configured to detect a change in status of a first upstream communication link between the first switching device and a network core. The second switching device is generally configured to receive, from the first switching device, notification of the change in status from the first switching device and, in response, disable first downstream communication links between first network interface devices on the plurality of end stations, thereby causing at least some of the plurality of end stations to switch to second downstream communications links between second network interface devices thereon and at least a third switching device.

Another embodiment provides an aggregation switching device generally including a processor and a computer readable medium containing instructions which, when executed by the processor, cause the switching device to perform operations. The operations generally include detecting a change in status of a first upstream communication link between the first switching device and a network and sending notification of the change in status to a second switching device in communication with an end station via a first downstream communication link.

Another embodiment provides an access switching device generally including a processor and a computer readable medium containing instructions which, when executed by the processor, cause the switching device to perform operations. The operations generally include in response to receiving, from an upstream switching device, notification of a detected change in status between the first switching device and a network, disabling at least one downstream communication link between the access switching device and at least one end station.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide methods and apparatus for propagating changes in upstream connectivity downstream. For some embodiments, an upstream switch connected to a network core may detect a change in connectivity and, in response, send a message indicating the change to a downstream switch connected to an end station. In response to the message, the downstream switch may disable a link with end station. Disabling the link may cause the end station to promptly switch (fail over) to a different link, in an effort to establish an alternate path to the network. Further, by maintaining the link between the intermediate or downstream switch and the upstream device, network traffic routed through that switch need not be re-routed and the link can continue to carry traffic destined for other networks.

Methods and apparatus for managing a multilayer switching path are described. In the following description, numerous specific details are set forth in order to provide a thorough understanding of the present invention. It will be appreciated, however, to one skilled in the art that the present invention may be practiced without these specific details. In other instances, well-known structures and devices are shown in block diagram form (absent specific details) in order to avoid unnecessarily obscuring the present invention.

To facilitate understanding, the following terms, as used herein, have the following meaning. As used herein, the term end station generally refers to any device capable of a network connection via one or more network interfaces and need not necessarily reside at an edge of a network. Examples of end stations include a server, PC, fax machine, printer, or the like. The term switch (or switching device) generally refers to any type device that switches network traffic, such as a Layer 2 switch (per the OSI model) that switches Ethernet traffic. The term access device generally refers to a network element that is connected to one or more end stations. The term aggregation device generally refers to a network element that connects to one or more access devices. The term upstream generally refers to a path (or device along a path) in the direction from an end station towards the core of the network. The term downstream generally refers to a path (or device along a path) in the direction from the core of the network to the edge (e.g., towards an end station). The terms link or connection may be used herein interchangeably and generally refer to any connection between devices, such as a Layer 2 network connection between two devices. The term failure generally refers to a loss of connectivity to a link from a device, regardless of the particular cause, including if the link is intentionally disabled by another device.

Propagating (Downstream) Changes in Upstream Connectivity

Embodiments of the present invention allow changes in upstream connectivity to be communicated downstream, thereby allowing an end station to quickly make decisions regarding which paths to use to the network. The techniques described herein may be implemented, for example, as software methods (e.g., executable instructions residing in memory) running on network devices (e.g., aggregation devices and/or access devices) that are directly or indirectly connected to a network interface of an end station. As will be described herein, the indirectly connected switches may track the link status on upstream interfaces and communicate any change in connectivity (loss/restoration) to a set of downstream interfaces, for example, by sending a message. Such a message may be intercepted by downstream network devices, such as access switches directly connected to network interfaces of the end stations. In response, these switches may take appropriate action based on the message communicated, for example, disabling corresponding active links if the message indicates loss of connectivity. This allows conventional end stations with redundant network interfaces to detect that their primary connection is down and to automatically switch over to their secondary network interfaces.

Figure 2:
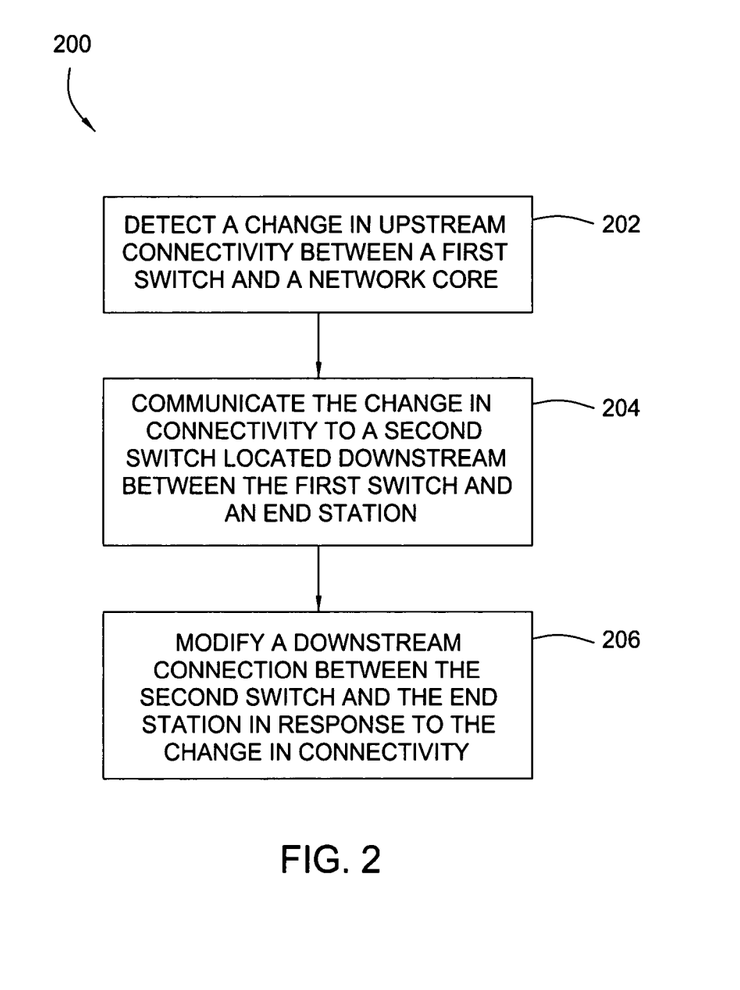
FIG. 2 is a flow diagram of exemplary operations for propagating upstream connectivity information to a downstream device, in accordance with embodiments of the present invention.

FIG. 2 is a flow diagram of exemplary operations for propagating upstream connectivity information to a downstream device, in accordance with embodiments of the present invention. For some embodiments, the operations 200 may be collectively performed by a combination of switches, such as aggregation switches connected to a network core and access switches connected to an end station. To illustrate the potential operation of the switching devices, the operations 200 may be described with reference to network diagrams of FIGS. 3A-3D, which illustrate the status of different links in the network as connectivity changes therein.

To facilitate understanding, only a limited portion of the network shown in FIG. 1 is illustrated in FIGS. 3A-3D. However, those skilled in the art will recognize that the concepts described herein may be advantageously scaled to accommodate any size and type of switching network having any number of multiple switching layers (e.g., any combination of aggregate switches, access switches, routers, and any other types of network elements), with potentially hundreds of end stations.

Figure 3A:
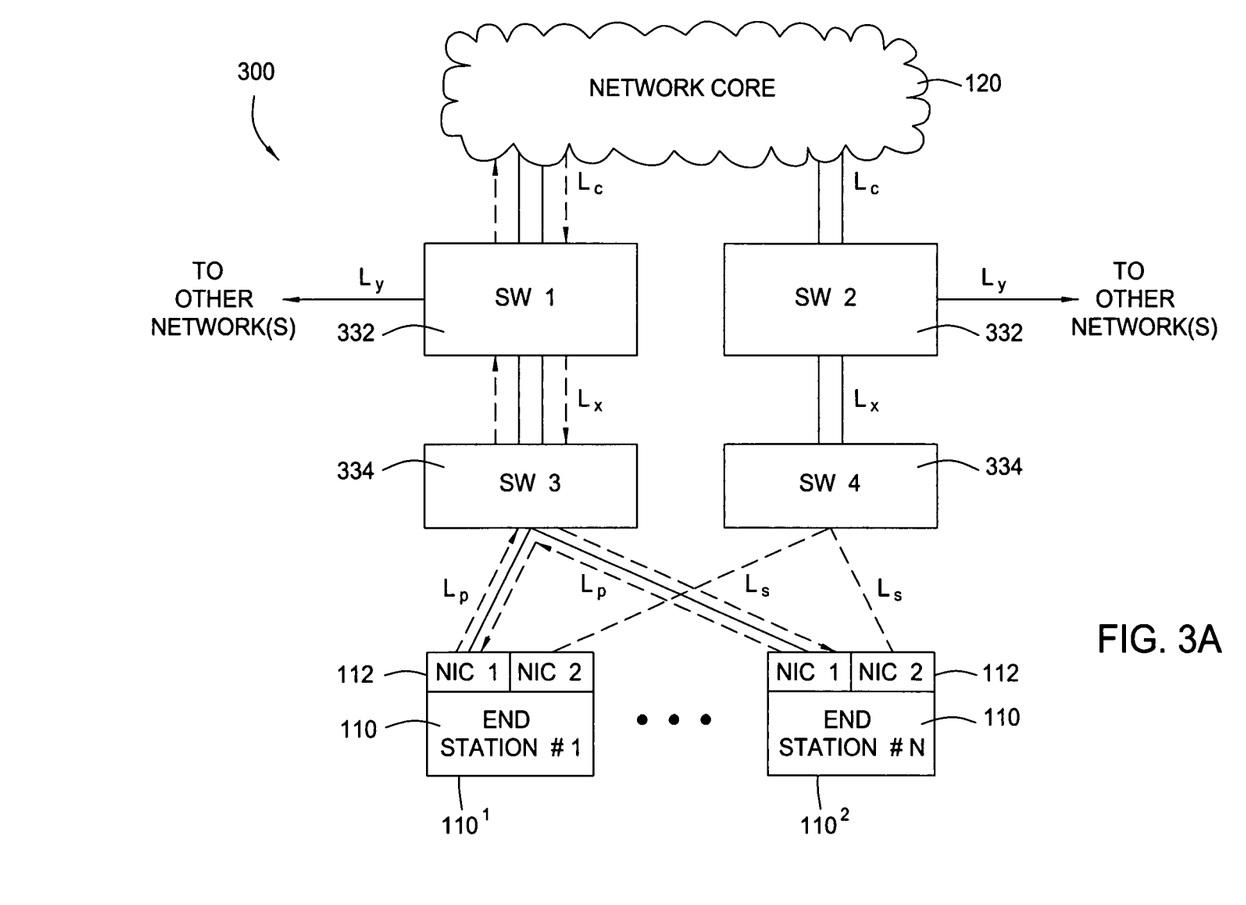
FIGS. 3A-3D illustrate propagating, and responding to, changes in upstream connectivity, in accordance with one embodiment of the present invention.
Figure 3B:
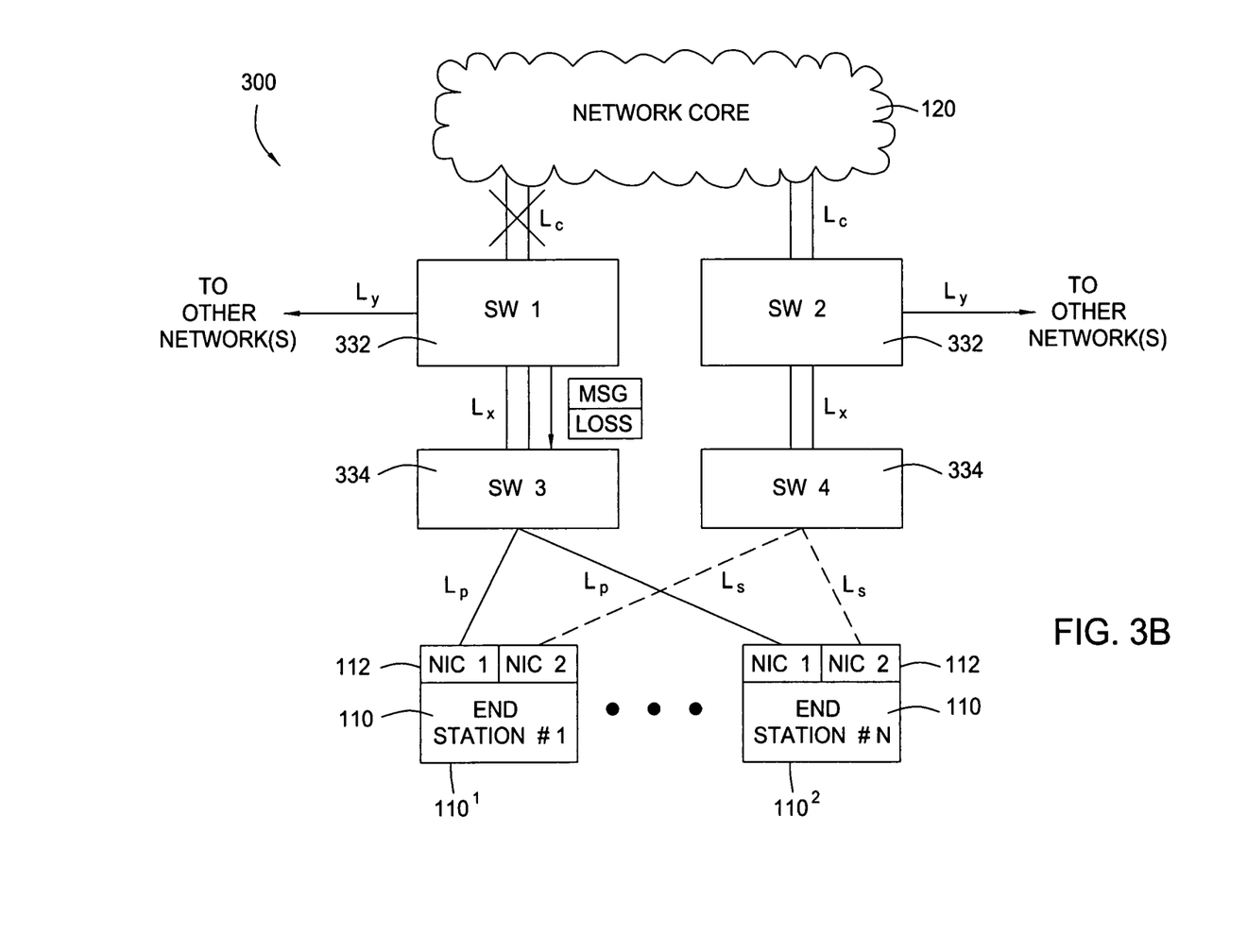

The operations begin, at step 202, by detecting a change in upstream connectivity between a first switch and a network core. Referring to FIG. 3A, the exemplary network shown includes a layer of aggregation switches 332 SW1 and SW2 and a layer of access switches 334 SW3 and SW4. As illustrated, a primary path between end stations 110 and the network core 120 may be established through SW3 and SW1 via first network interface cards 112 (NIC1). As illustrated in FIG. 3, however, a loss of connectivity between SW1 and the network core may occur for any number of reasons (e.g., device failure, such as failure of a laser in a fiber optic connection, failure in the physical connection/cable, or loss of power). For some embodiments, switches SW3 may have downstream connections to both end stations and other switches, not just to one another.

At step 204, the change in connectivity is communicated to a second switch located downstream between the first switch and an end station. As further illustrated in FIG. 3B, the first switch SW1 may communicate the change in connectivity (a loss in this example), to second switch SW3 via a change in connectivity message. As will be described in greater detail below, the contents of the message may vary, as may the recipients. For some embodiments, a user (e.g., network administrator) may be able to configure the manner in which the message is sent, for example, broadcasting to all devices to respond/ignore or only sending the message to identified devices (e.g., along a path to an end device).

Figure 3C:
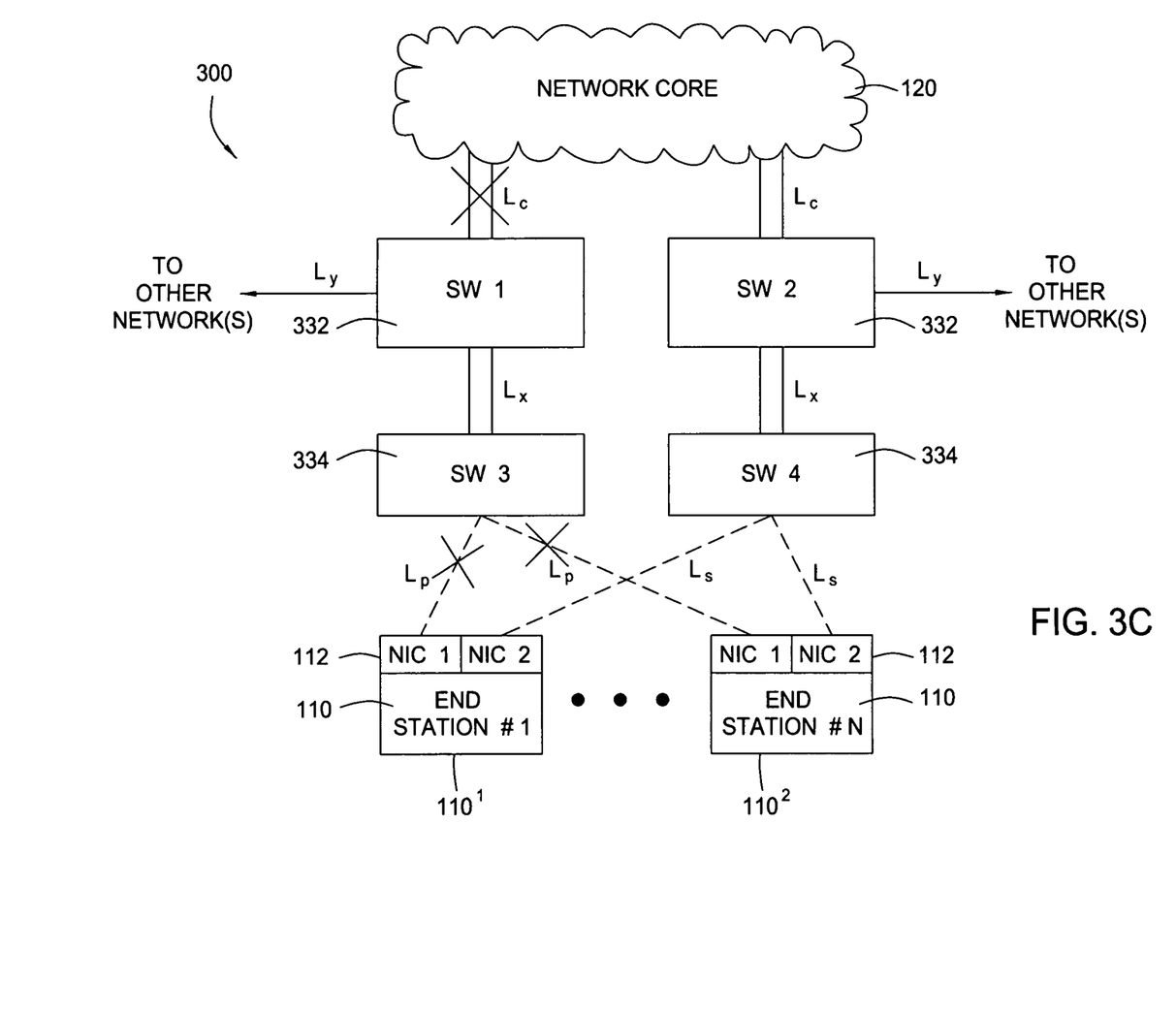

At step 206, a downstream connection between the second switch and the end station is modified in response to the change in connectivity. For example, as illustrated in FIG. 3C, SW3 may decipher the message from SW1 and, in response, disable (bring down) the link between the primary NICs of the end stations 110. Exactly how the link is disabled may depend on the corresponding type of physical medium. For example, for an Ethernet connection this may entail simply ceasing to transmit a signal (e.g., by disabling a laser for a fiber optic Ethernet connection or bringing down the voltage level for a copper Ethernet connection).

Figure 3D:
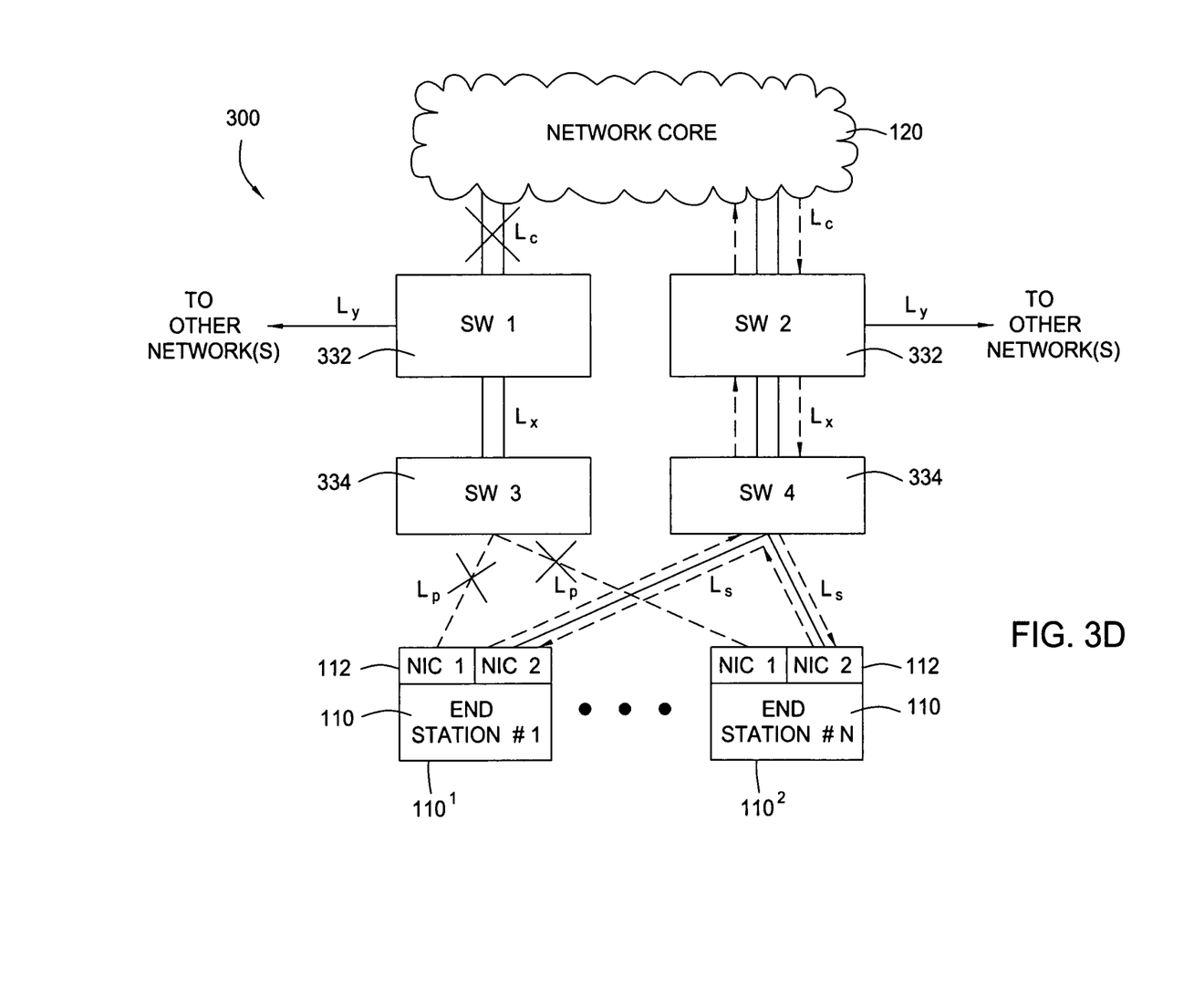

In any case, end stations equipped with redundant network interfaces may be configured to react to such a loss in connectivity to a primary link by automatically switching (or "failing over") to a secondary interface in order to establish an alternate path to the network. Thus, in the illustrated example as shown in FIG. 3D, end stations 110 may automatically switch over to secondary NICs to establish an alternate path to the core network via SW4 and SW2.

For some embodiments, should the connectivity between SW1 and the network core be restored, switch SW1 may forward another message to SW3 (and/or other connected devices) indicating such. In response to the message, SW3 may bring the link with the connected end station back up, restoring it to an operational state. In response to detecting that the primary link has been brought back up, one or more of the end stations 110 may switch back to the primary connections immediately, or at any appropriate later time, for example, depending on the particular circumstance.

By propagating an upstream Layer 2 connectivity failure in this manner, switchover times for the end stations may be reduced. In other words, end stations may switchover much more rapidly than in conventional systems that rely on waiting for a higher layer protocol running on these end stations to detect that its link to the network is not working properly. These higher layer protocols typically rely upon timers to fail, and also have to account for network congestion to avoid erroneously detecting "false" failures.

In addition to improving switchover times, the techniques described herein also allow upstream switches (e.g., SW1 and SW2) to maintain their interfaces to downstream devices (e.g., SW3 and SW4). This is advantageous in that other network traffic may continue to pass through the interface from access devices to aggregation devices and allows multiple networks to be active that would otherwise be inactive if this link were brought down. These links ($L_X$) may continue to carry traffic for management, as well as other local network traffic.

Configuring Upstream Failure Propagation

The particular manner in which changes in upstream connectivity are propagated down to an end station may vary, depending on a particular implementation. As an example, the particular format and contents of the message sent by an upstream device to communicate a change in upstream connectivity may vary. For some embodiments, the contents of the message may include at least an indication of the detected change (e.g., loss or restoration), as well as any other suitable information, such as identification of an intended recipient (destination). The type and/or number of devices to receive a message indicating a change in connectivity may also vary depending on a particular implementation and, for some embodiments, may be configurable by a user (e.g., a network administrator).

The contents of messages may vary with different embodiments and different types of messages may be sent (e.g., broadcast to many devices or sent directly to identified recipients). In any case, messages may include a common set of fields including, but not limited to one or more of the following: 1) a Switch identifier (source of the msg); 2) a Msg_type/Action_type (e.g., Link Lost, Link Restored, or link removed from being monitored, for example, if a user reconfigures a link from being the cause of downstream interfaces being brought down); 3) an Upstream Link Identifier (which may be at least be unique on the source switch); 4) a SW Version of some type; 5) a msg counter for a number of msgs of this type sent; and 6) a time stamp of action occurrence. For some embodiments, the Upstream Link Identifier may be a field in the message that identifies the upstream interface. As an alternative, the message may include an identifier of a group that is effected by the change in connectivity of an upstream interface. The upstream interface may be a single physical interface, or it could be a logical grouping of physical interfaces.

The particular contents of a message may depend on the particular type of message being sent. For some embodiments, there may be at least two types of messages, for example, broadcast or direct, with each having different contents. Regardless of the implementation, msg contents would most likely contain a common set of fields, such as those listed above. The field contents, however, would likely change depending up on the action and the source switch.

Figure 4:
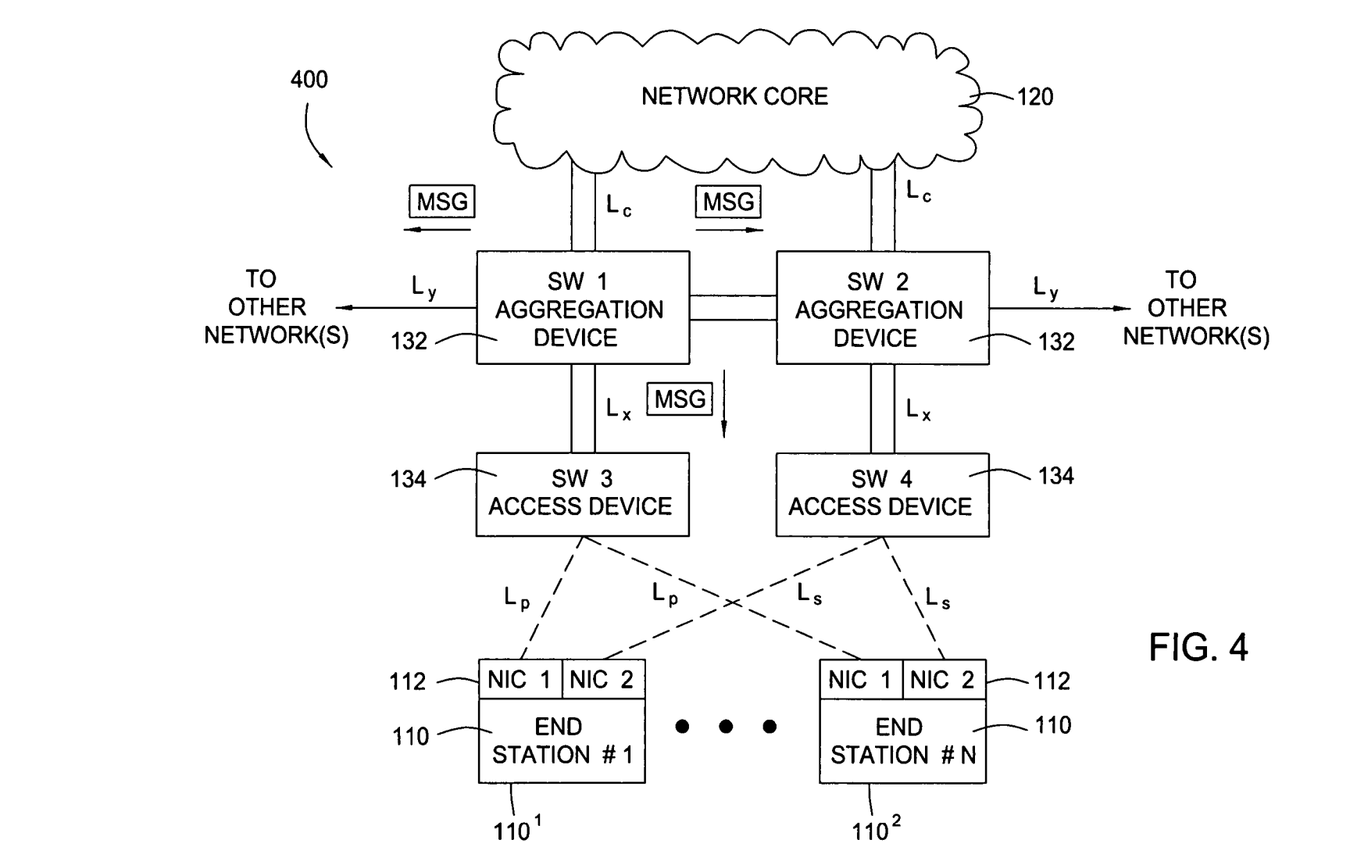
FIG. 4 illustrates the routing of traffic through links maintained between access and aggregation devices, in accordance with one embodiment of the present invention.

As illustrated in FIG. 4, for some embodiments, a message may be broadcast to multiple devices connected to a switch detecting a change in communication status. How the message is treated may depend on the particular recipient. As an example, a switch, such as SW3 in a downstream path between the switch sending the message may intercept the message and respond accordingly, while other devices may ignore the message or forward it on to other devices connected thereto.

Figure 5:
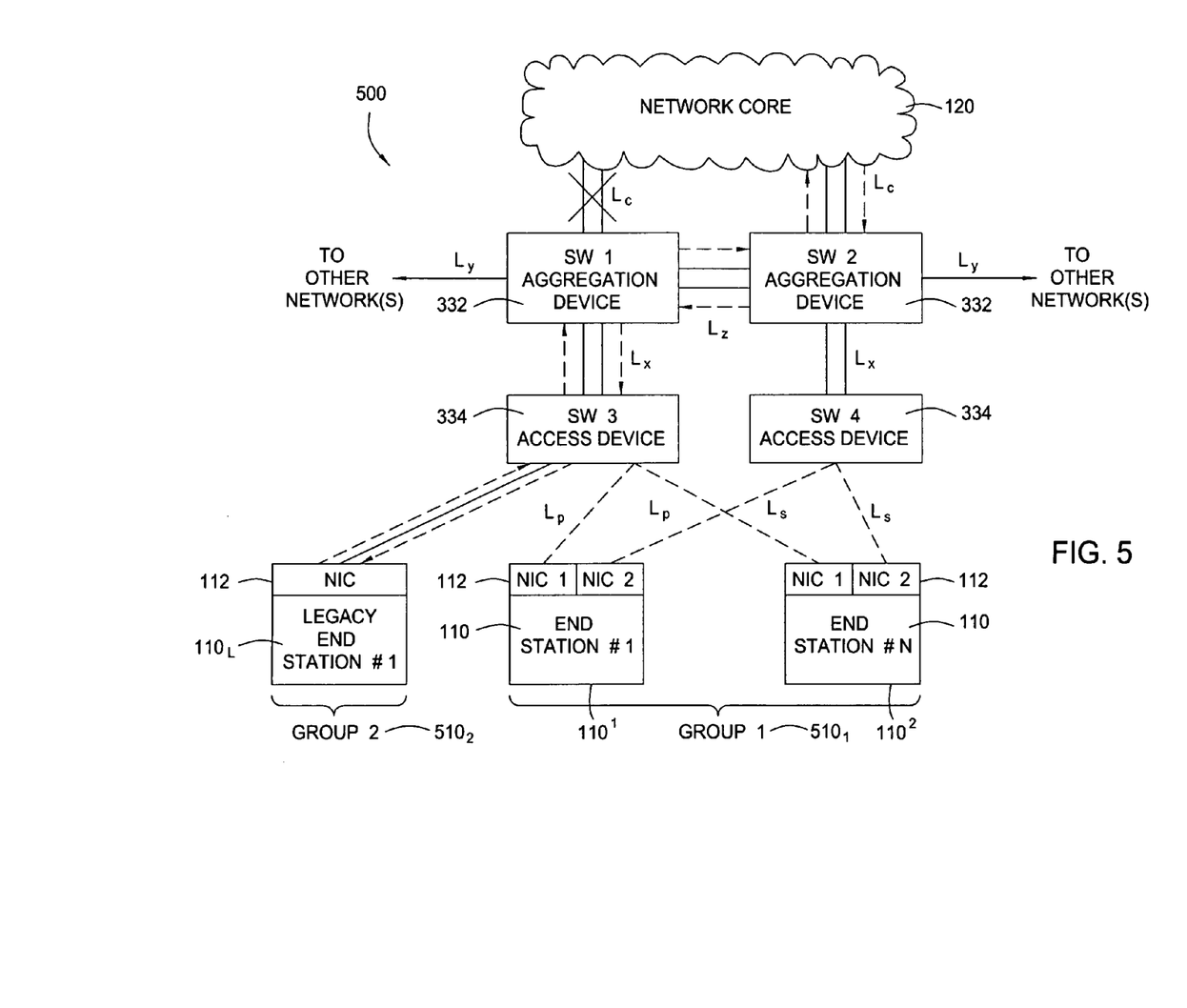
FIG. 5 is a flow diagram of exemplary operations for propagating changes in connectivity, in accordance with embodiments of the present invention.

For some embodiments, a user may be able to configure a particular set of downstream interfaces that should be brought down upon receiving a message indicating a loss of upstream connectivity. For example, as illustrated in FIG. 5, a user may be able to define a first group $510_1$ of end stations with primary interfaces connected to a switch SW3 that should be brought down in the event that connectivity between SW1 and the network core ($L_C$) is lost. This grouping may define a logical connection between these end stations and an upstream interface. As a result, in response to detecting a change in connectivity of the upstream interface, switch SW3 may disable the end stations in the first group $510_1$. In response to the primary interface being disabled, the end stations may automatically switch over to secondary interfaces connected to SW4.

A second group of end stations $510_2$ may not have a secondary NIC and, thus should not be brought down in the event that upstream connectivity is lost. Such end stations (e.g., older "legacy" end stations) may not have the capability to switch over from a primary to secondary interface. As such, the downstream interfaces connecting to such end stations may be configured to be maintained (not brought down) by the user in the case of an upstream link losing connectivity. As illustrated, end stations in Group 2 may continue to use the same interface with SW3 and their traffic may be routed to the network core via a redundant link ($L_Z$) between SW1 and SW2 to reach the core. While the bandwidth of the redundant link $L_Z$ may not be as high as the direct link to the core (link $L_C$) and may not be meant to carry sustained traffic to the core, it may still allow the end station to remain active.

For some embodiments, the techniques described herein may be configurable by a user, for example, via a user command to run automatically, on demand, or be disabled. In some cases, a user may be allowed to define logical grouping of upstream interfaces to downstream interfaces. Further, for some embodiments, in addition to, or as an alternative to selecting groups, the techniques described herein could be configurable to be enabled in a variety of ways with varying scope, such as on a "per port" basis, via a particular connection (e.g., a VLAN), or switch-wide.

CONCLUSION

By propagating upstream connectivity losses detected by an upstream device to a downstream device connected, the downstream device may bring down a connection with an end station. Bringing down the connection may result in the end station promptly switching over to a redundant connection. Further, by maintaining the link between the intermediate switch and the upstream device, network traffic routed therethrough need not be re-routed.

While the foregoing is directed to embodiments of the present invention, other and further embodiments of the invention may be devised without departing from the basic scope thereof, and the scope thereof is determined by the claims that follow.

What is claimed is:

1. A method for managing a network path between at least one end station and a network core, comprising:
    detecting, by a first network device, a change in status of a first upstream communication link between the first network device and the network core, wherein the change in status of the first upstream communication link comprises a loss in connectivity between the first network device and the network core;
    sending, by the first network device, via an aggregate link between the first network device and a second network device, notification of the change in status to the second network device, wherein the second network device is in communication with a plurality of end stations via respective first downstream communication links, and wherein the notification identifies a group of one or more of the end stations affected by the loss in connectivity;
    disabling the first downstream communication links in a manner that causes each end station in the group to failover to a second downstream link between a third network device and the end station to establish an alternate path between the group of one or more end stations and the network core that does not include the first network device; and
    continuing to carry network traffic received on the aggregate link originating from at least one end station after sending the notification of change in status to the second network device.

2. The method of claim 1, wherein one or more intermediate network devices, between the first and second network devices, receives the notification of the change in status from the first network device and forwards the notification to the second network device.

3. The method of claim 1, wherein sending the notification, by the first network device, of the change in status to the second network device comprises:
    sending a message from the first network device to one or more network devices in communication with the first network device.

4. The method of claim 3, wherein sending the message from the first network device to one or more network devices in communication with the first network device comprises sending a message to one or more designated network devices specified by a user.

5. The method of claim 1, wherein the second network device is configured to forward a message containing the notification to one or more designated network devices specified by a user.

6. The method of claim 1, wherein the notification of the change in status includes an identifier of a group defined by a user to include the end station.

7. The method of claim 1, further comprising:
    detecting, by the first network device, recovery of connectivity between the first network device and the network core; and
    sending, by the first network device, notification of the recovery in status to the second network device; and
    in response to receiving the notification of the recovery in status, enabling by the second network device, the first downstream communication link.

8. A network switching system, comprising:
    at least a first network device configured to detect a change in status of a first upstream communication link between the first network device and a network core, wherein the change in status of the first upstream communication link comprises a loss in connectivity between the first network device and the network core;
    at least a second network device configured to receive, from the first network device, notification of the change in status from the first network device, via an aggregate link between the first network device and the second network device, wherein the notification identifies a group of one or more of the end stations affected by the loss in connectivity
    a first downstream communication link between the second network device and each end station in the group that is disabled in response to the notification of the change in status, wherein the aggregate link continues to carry traffic for management of the network switching system after disabling the first downstream communication link and further continues to carry network traffic originating from at least one end station after sending the notification of change in status to the second network device; and
    a second downstream link between a third network device and each end station in the group that is established as an alternate path between the end station and the network core that does not include the first network device when the first downstream communication link is disabled.

9. The system of claim 8, further comprising one or more intermediate network devices, between the first and second network devices, configured to receive the notification of the change in status from the first network device and forward the notification to the second network device.

10. The system of claim 8, wherein the first network device is configured to send notification of the change in status to a plurality of designated network devices specified by a user.

11. The system of claim 8, wherein the notification of the change in status includes an identifier of a group defined by a user to include the end station.

12. A system, comprising:
a plurality of end stations;
at least a first network device configured to detect a change in status of a first upstream communication link between the first network device and a network core, wherein the change in status of the first upstream communication link is a loss in connectivity between the first network device and the network core; and
at least a second network device configured to receive, from the first network device, via an aggregate link between the first network device and the second network device, notification of the change in status from the first network device, wherein the notification identifies a group of one or more of the end stations in communication with the second network device affected by the loss in connectivity;
downstream communication links between first network interface devices on the plurality of end stations including a respective first downstream communication link with each of the identified group of the end stations that is disabled in response to the notification of the change in status, wherein the aggregate link continues to carry traffic for management of the system after the first downstream communication link is disabled and further continues to carry network traffic originating from at least one of the end stations after sending the notification of change in status to the second network device;
additional downstream communications links between second network interface devices thereon and at least a third network device including a respective second downstream communications link that is established in response to the disabling of the first downstream communication link to provide an alternate path between of the identified group of end stations and the network core that does not include the first network device.

13. The system of claim 12, wherein the plurality of end stations comprises at least one end station without a second network interface.

14. The system of claim 12, wherein the notification of the change in status includes an identifier of a group defined by a user to include the at least some of the plurality of end stations.

15. An aggregation device comprising:
a processor; and
a non-transitory computer readable medium containing instructions which, when executed by the processor, cause the aggregation device to perform operations comprising:
detecting a change in status of a first upstream communication link between the aggregation device and a network core, wherein the change in status of the first upstream communication link is a loss in connectivity between the aggregation device and the network core,
sending notification of the change in status, via an aggregate link between the aggregation device and a first network device, to the first network device in communication with a plurality of end stations via respective first downstream communication links,
identifying a group of one or more of the end stations in communication with the first network device effected by the loss in connectivity,
disabling the first downstream communication link of each end station in the group of one or more end stations in a manner that causes the end stations in the group to each failover to a respective second downstream link to a second network device and the respective end station to establish an alternate path between the respective end station and the network core that does not include the aggregation device and further continues to carry network traffic originating from at least one of the plurality of end stations after sending the notification of change in status to the first network device, and
maintaining the aggregate link to continue to carry traffic for management of a network after sending the notification and to carry network traffic originating from at least a second end station after sending the notification of change in status to the first network device.

16. The aggregation device of claim 15, wherein the operations further comprise:
detecting recovery of connectivity between the aggregation device and the network core; and
sending notification of the recovery in status to the first network device.

17. The method of claim 1, wherein the notification of the change in status includes a time stamp of action occurrence.

18. The network switching system of claim 8, wherein the notification of the change in status includes a message counter for a number of messages sent for changes in status.

19. The system of claim 12, wherein the notification of the change in status includes a time stamp of action occurrence.

20. The aggregation device of claim 15, wherein the notification of the change in status includes a message counter for a number of messages sent for changes in status.

21. The aggregation device of claim 15, wherein the notification of the change in status includes an identifier of a group defined by a user to include the end station.

22. A method for managing network connectivity, comprising:
receiving, at a second network device, a notification of a loss of connectivity in an upstream communication link between a first network device and a network core, wherein the first network device and the second network device are connected by an aggregate communication link;
identifying a group of one or more end stations in communication with the second network device affected by the loss of connectivity in the upstream communication link between the first network device and the network core;
in response to receiving the notification, disabling a network connection with each end station in the identified group of end stations in a manner that causes each end station in the identified group to failover to a downstream link between that end station and a third network device in order to establish an alternate path to the network core that does not include the first network device; and
continuing to carry network traffic received on the aggregate communication link connecting the first network device and second network device originating from at least one end station not in the identified group of end stations after receiving the notification of the loss of connectivity.

* * * * *